US008600525B1

(12) United States Patent
Mustafa et al.

(10) Patent No.: US 8,600,525 B1
(45) Date of Patent: Dec. 3, 2013

(54) EFFICIENT QUADRATIC PROGRAMMING (QP) SOLVER FOR PROCESS CONTROL AND OPTIMIZATION

(75) Inventors: Ghulam Mustafa, Edmonton (CA); Jiadong Wang, Edmonton (CA); Tongwen Chen, Edmonton (CA); Danlei Chu, North Vancouver (CA); Johan U. Backstrom, North Vancouver (CA)

(73) Assignee: Honeywell ASCa Inc., Mississauga, Ontario (CA)

( * ) Notice: Subject to any disclaimer, the term of this patent is extended or adjusted under 35 U.S.C. 154(b) by 0 days.

(21) Appl. No.: 13/485,594

(22) Filed: May 31, 2012

(51) Int. Cl.
*G05B 15/00* (2006.01)
*G05B 13/02* (2006.01)

(52) U.S. Cl.
USPC ............. 700/33; 700/1; 700/28; 700/34

(58) Field of Classification Search
USPC .......................... 700/1, 28, 33–34
See application file for complete search history.

(56) References Cited

U.S. PATENT DOCUMENTS

| | | | | |
|---|---|---|---|---|
| 5,185,715 | A * | 2/1993 | Zikan et al. ............... | 708/801 |
| 6,256,609 | B1 * | 7/2001 | Byrnes et al. ............... | 704/246 |
| 7,268,873 | B2 * | 9/2007 | Sevick-Muraca et al. .... | 356/336 |
| 2005/0197875 | A1 * | 9/2005 | Kauffman ..................... | 705/7 |
| 2008/0072182 | A1 * | 3/2008 | He et al. ...................... | 716/2 |
| 2008/0077361 | A1 * | 3/2008 | Boyd et al. ................... | 702/189 |
| 2008/0244072 | A1 * | 10/2008 | Broberg et al. ............... | 709/226 |
| 2009/0271443 | A1 * | 10/2009 | Haas et al. .................... | 707/200 |

OTHER PUBLICATIONS

J. Backstrom, et al.: "Constrained Model Predictive Control for Cross Directional Multi-Array Processes," Pulp and Paper Canada, vol. 102, No. 5, pp. 33-36, 2001.
R. Bartlett, et al.: "QPSchur: A Dual, Active-Set, Schur-Complement Method for Large-Scale and Structured Convex Quadratic Programming," Optimization and Engineering, vol. 7, No. 1, pp. 5-32, Mar. 2006.
R. Bartlett, et al.: "Quadratic Programming Algorithms for Large-Scale Model Predictive Control," Journal of Process Control, vol. 12, No. 7, pp. 775-795, 2002.
R. Bartlett, et al.: "Active Set vs. Interior Point Strategies for Model Predictive Control," in Proceedings of the America Control Conference, vol. 6, 2000, pp. 4229-4233.
E. Camacho, et al.: "Model Predictive Control," New York: Springer-Verlag, 1999, 4 pages.
D. Chu, et al.: "Model Predictive Control and Optimization for Papermaking Processes," in Advanced Model Predictive Control, T. Zheng. Ed. InTech, 2011, pp. 309-342.
D. Dimitrov, et al.: "An Optimized Linear Model Predictive Control Solver for Online Walking Motion Generation," in Proceedings of the 2009 IEEE International Conference on Robotics and Automation, 2009, pp. 1171-1176.

(Continued)

*Primary Examiner* — Ronald Hartman, Jr.

(57) ABSTRACT

A method includes identifying an initial solution to a quadratic programming (QP) problem associated with a process. The method also includes performing an iterative procedure having one or more iterations. Each iteration includes determining whether any constraint associated with the process is violated in the solution. Each iteration also includes selecting a violated constraint, determining a step direction and a step length associated with the selected violated constraint, and updating the solution based on the step direction and the step length. Determining the step direction and the step length includes using a Schur complement based on an active set of constraints associated with the solution. The Schur complement is nonsingular during all iterations of the iterative procedure except when the active set is empty.

23 Claims, 4 Drawing Sheets

(56) References Cited

OTHER PUBLICATIONS

J. Fan: "Model Predictive Control for Multiple Cross-Directional Processes: Analysis, Tuning, and Implementation," PhD Thesis, University of British Columbia, British Columbia, Sep. 2003, 172 pages.

J. Fan, et al.: "Two-Dimensional Frequency Analysis for Unconstrained Model Predictive Control of Cross-Directional Processes," Automatica, vol. 40, No. 11, pp. 1891-1903, 2004.

Gene H. Golub, et al.: "Matrix Computations," 3rd ed., The Johns Hopkins University Press, Oct. 1996, 6 pages.

J.R. Gilbert, et al.: "Sparse Matrices in MATLAB: Design and Implementation," SIAM Journal on Matrix Analysis and Applications, vol. 13, No. 1, pp. 1-24, 1992.

D. Goldfarb, et al.: "A Numerically Stable Dual Method for Solving Strictly Convex Quadratic Programs," Mathematical Programming, vol. 27, pp. 1-33, 1983.

A. Hansson, "A Primal-Dual Interior-Point Method for Robust Optimal Control of Linear Discrete-Time Systems," IEEE Transactions on Automatic Control, vol. 45, No. 9, pp. 1639-1655, 2000.

H. Huynh, "A Large-Scale Quadratic Programming Solver Based on Block-Lu Updates of the KKT System," PhD Thesis, Stanford University, Sep. 2008, 102 pages.

J. Mattingley, et al.: "Receding Horizon Control: Automatic Generation of High-Speed Solvers," IEEE Control Systems Magazine, vol. 31, No. 3, pp. 52-65, Jun. 2011.

L. Wang: "Model Predictive Control System Design and Implementation Using MATLAB," Springer-Verlag London Ltd., 2009, 5 pages.

Y. Wang, et al.: "Fast Model Predictive Control Using Online Optimization," IEEE Transactions on Control Systems Technology, vol. 18, No. 2, pp. 267-278, 2010.

A. Lahouaoula, et al.: "Constrained Model Predictive Control for Cross Directional Control—Some Practical Examples," 2007 TAPPI Papermakers & PIMA Int'l Leadership Conference, Mar. 2007, 38 pages.

J. Fan, et al.: "Two-Dimensional Frequency Analysis of Structured Uncertainty for Multiple Array Paper Machine Cross-Directional Processes," 44th IEEE Conference on Decision and Control, and the European Control Conference, Seville, Spain, Dec. 12-15, 2005, pp. 3031-3036.

\* cited by examiner

EFFICIENT QUADRATIC PROGRAMMING (QP) SOLVER FOR PROCESS CONTROL AND OPTIMIZATION

TECHNICAL FIELD

This disclosure relates generally to control and optimization systems. More specifically, this disclosure relates to an efficient quadratic programming (QP) solver for process control and optimization.

BACKGROUND

Model predictive control (MPC) is a popular technique for controlling multi-input and multi-output processes, such as industrial manufacturing processes. MPC uses a model to predict how one or more controlled process variables are expected to behave in the future. Changes can then be made to one or more manipulated process variables in order to alter the controlled process variable(s). Ideally, each controlled process variable is thereby maintained within a desired range.

An MPC controller often implements an online quadratic programming (QP) solver for solving an optimization problem related to a controlled process. However, the efficient execution of an optimization routine often poses challenges in various circumstances. For example, process processes may involve hundreds of manipulated process variables and thousands of controlled process variables (many with active limits and rate constraints). Also, control intervals can be relatively short, such as ten to twenty seconds. While generic and custom QP solvers have been developed, they often suffer from various shortcomings.

SUMMARY

This disclosure provides an efficient quadratic programming (QP) solver for process control and optimization.

In a first embodiment, a method includes identifying an initial solution to a quadratic programming (QP) problem associated with a process. The method also includes performing an iterative procedure having one or more iterations. Each iteration includes determining whether any constraint associated with the process is violated in the solution. If so, each iteration also includes selecting a violated constraint, determining a step direction and a step length associated with the selected violated constraint, and updating the solution based on the step direction and the step length. Determining the step direction and the step length includes using a Schur complement based on an active set of constraints associated with the solution. The Schur complement is nonsingular during all iterations of the iterative procedure except when the active set is empty.

In a second embodiment, an apparatus includes at least one memory configured to store an initial solution to a quadratic programming (QP) problem associated with a process. The apparatus also includes at least one processing device configured to perform an iterative procedure having one or more iterations. During each iteration, the at least one processing device is configured to determine whether any constraint associated with the process is violated in the solution. If so, the at least one processing device is also configured to select a violated constraint, determine a step direction and a step length associated with the selected violated constraint, and update the solution based on the step direction and the step length. The at least one processing device is configured to determine the step direction and the step length using a Schur complement based on an active set of constraints associated with the solution. The Schur complement is nonsingular during all iterations of the iterative procedure except when the active set is empty.

In a third embodiment, a computer readable medium embodies a computer program. The computer program includes computer readable program code for identifying an initial solution to a quadratic programming (QP) problem associated with a process. The computer program also includes computer readable program code for performing an iterative procedure having one or more iterations. Each iteration includes determining whether any constraint associated with the process is violated in the solution. If so, each iteration also includes selecting a violated constraint, determining a step direction and a step length associated with the selected violated constraint, and updating the solution based on the step direction and the step length. The computer readable program code for determining the step direction and the step length includes computer readable program code for using a Schur complement based on an active set of constraints associated with the solution. The Schur complement is nonsingular during all iterations of the iterative procedure except when the active set is empty.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Conventionally, a control or optimization problem in a given industry is solved using a general-purpose quadratic programming (QP) solver or a customized QP solver. However, general-purpose QP solvers often have various shortcomings. For example, general-purpose QP solvers are intended to solve a broader class of problems and may not achieve performance that a customized QP solver could achieve. Also, general-purpose QP solvers may not take advantage of a specific problem's structure and features for a given industry, which might otherwise significantly reduce the computation time needed to identify a problem solution. Customized QP solvers also often have various shortcomings, such as a poorly organized algorithm structure or defects that can result in complete control failure. A poorly organized structure makes the solver less reliable and makes it harder to diagnose problems (such as infeasible solutions).

This disclosure describes an efficient QP solver for process control and optimization. The QP solver disclosed here is based on a dual-feasible active-set algorithm, a Schur complement method, and a warm start strategy. The Schur complement is nonsingular throughout its iterations, which makes the QP solver very reliable numerically and helps to avoid control failures. The QP solver can also identify problem solutions much faster than conventional QP solvers.

Different from general-purpose QP solvers, the efficient QP solver disclosed here solves a control or optimization problem by taking advantage of the problem's structure and features, which can vary depending on the specific application of the QP solver. By doing this, the QP solver can speed up solution computations and enable a controller to control a process closer to the process' physical limits, resulting in increased process efficiency and product quality.

In particular embodiments described below, the QP solver is used for cross direction (CD) control in a paper-making process. However, this represents one example use of the QP solver. The QP solver can generally be used in any other suitable device or system having at least one array of actuators that are controlled using a solution to a QP problem, such as any large-scale spatially-distributed system.

Figure 1:
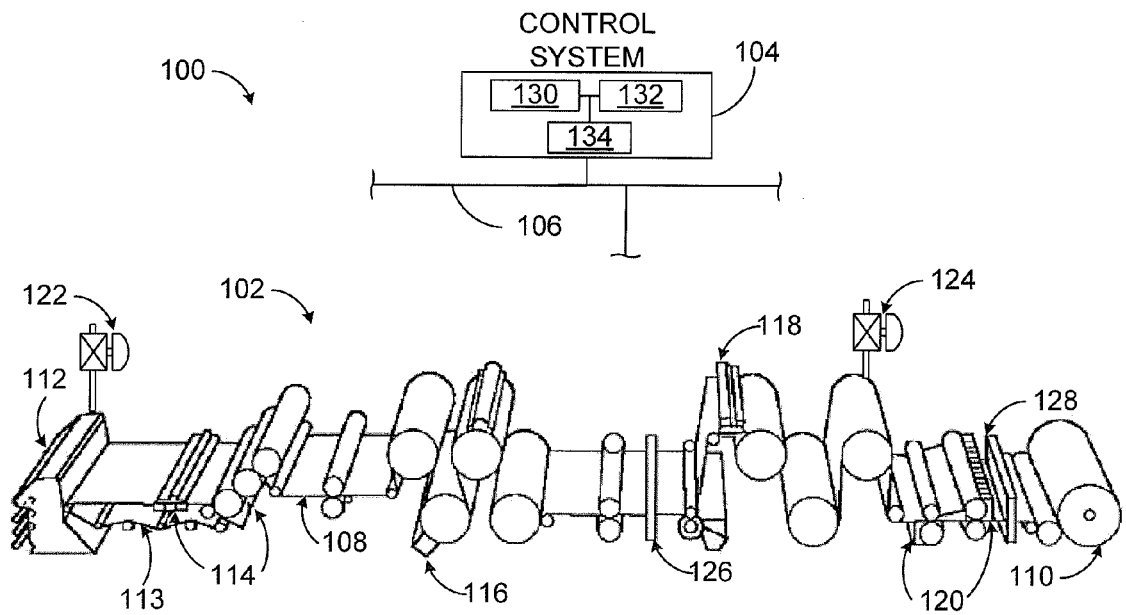
FIG. 1 illustrates an example sheet manufacturing or processing system according to this disclosure.

FIG. 1 illustrates an example sheet manufacturing or processing system 100 according to this disclosure. In this example, the system 100 includes a paper machine 102, a control system 104, and a network 106. The paper machine 102 includes various components used to produce a paper product, namely a paper sheet 108 that is collected at a reel 110. The control system 104 monitors and controls the operation of the paper machine 102, which may help to maintain or increase the quality of the paper sheet 108 produced by the paper machine 102.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water. The headbox 112 may include an array of dilution actuators, which distributes dilution water into the pulp suspension across the sheet. The dilution water may be used to help ensure that the resulting paper sheet 108 has a more uniform basis weight across the sheet 108.

Arrays of drainage elements 114, such as vacuum boxes, remove as much water as possible to initiate the formation of the sheet 108. An array of steam actuators 116 produces hot steam that penetrates the paper sheet 108 and releases the latent heat of the steam into the paper sheet 108, thereby increasing the temperature of the paper sheet 108 in sections across the sheet. The increase in temperature may allow for easier removal of remaining water from the paper sheet 108. An array of rewet shower actuators 118 adds small droplets of water (which may be air atomized) onto the surface of the paper sheet 108. The array of rewet shower actuators 118 may be used to control the moisture profile of the paper sheet 108, reduce or prevent over-drying of the paper sheet 108, or correct any dry streaks in the paper sheet 108.

The paper sheet 108 is then often passed through a calender having several nips of counter-rotating rolls. Arrays of induction heating actuators 120 heat the shell surfaces of various ones of these rolls. As each roll surface locally heats up, the roll diameter is locally expanded and hence increases nip pressure, which in turn locally compresses the paper sheet 108. The arrays of induction heating actuators 120 may therefore be used to control the caliper (thickness) profile of the paper sheet 108. The nips of a calender may also be equipped with other actuator arrays, such as arrays of air showers or steam showers, which may be used to control the gloss profile or smoothness profile of the paper sheet.

Two additional actuators 122-124 are shown in FIG. 1. A thick stock flow actuator 122 controls the consistency of incoming stock received at the headbox 112. A steam flow actuator 124 controls the amount of heat transferred to the paper sheet 108 from drying cylinders. The actuators 122-124 could, for example, represent valves controlling the flow of stock and steam, respectively. These actuators may be used for controlling the dry weight and moisture of the paper sheet 108.

Additional components could be used to further process the paper sheet 108, such as a supercalender (for improving the paper sheet's thickness, smoothness, and gloss) or one or more coating stations (each applying a layer of coatant to a surface of the paper to improve the smoothness and printability of the paper sheet). Similarly, additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that process a paper product or with systems that produce or process other items or materials (such as multi-layer paperboard, cardboard, plastic, textiles, metal foil or sheets, or other or additional materials that are manufactured or processed as moving sheets).

In order to control the paper-making process, one or more properties of the paper sheet 108 may be continuously or repeatedly measured. The sheet properties can be measured at one or various stages in the manufacturing process. This information may then be used to adjust the paper machine 102, such as by adjusting various actuators within the paper machine 102. This may help to compensate for any variations of the sheet properties from desired targets, which may help to ensure the quality of the sheet 108.

As shown in FIG. 1, the paper machine 102 includes one or more sensor arrays 126-128, each of which may include one or more sensors. Each sensor array 126-128 is capable of measuring one or more characteristics of the paper sheet 108. For example, each sensor array 126-128 could include sensors for measuring the moisture, basis weight, caliper, coat weight, anisotropy, color, gloss, sheen, haze, fiber orientation, surface features (such as roughness, topography, or orientation distributions of surface features), or any other or additional characteristics of the paper sheet 108.

Each sensor array 126-128 includes any suitable structure or structures for measuring or detecting one or more characteristics of the paper sheet 108. The sensors in a sensor array 126-128 could be stationary or scanning sensors. Stationary sensors could be deployed in one or a few locations across the sheet 108, or they could be deployed at multiple locations across the whole width of the sheet 108 such that substantially the entire sheet width is measured. A scanning set of sensors could include any number of moving sensors.

The control system 104 receives measurement data from the sensor arrays 126-128 and uses the data to control the paper machine 102. For example, the control system 104 may use the measurement data to adjust any of the actuators or other components of the paper machine 102. The control system 104 includes any suitable structure for controlling the operation of at least part of the paper machine 102, such as one or more computing devices. In this example, the control system 104 includes at least one processing device 130 and at least one memory 132 storing instructions and data used, generated, or collected by the processing device(s) 130. The control system 104 also includes at least one network interface 134 for communicating over one or more networks, such as an Ethernet network, an electrical signal network, or any other or additional type(s) of network(s). The control system 104 could include a single computing device with these components, or multiple distributed computing devices could include multiple instances of these components.

The network 106 is coupled to the control system 104 and various components of the paper machine 102 (such as the actuators and sensor arrays). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDATION FIELD-BUS network), a pneumatic control signal network, or any other or additional network(s).

In the system 100 of FIG. 1, various actuator arrays represent CD actuator arrays, such as the dilution actuators, steam actuators, rewet shower actuators, and induction heating actuators. These actuator arrays control characteristics of the sheet 108 in the cross direction across the width of the sheet 108 (as opposed to the machine direction along the length of the sheet 108). A collection of actuators in one or more arrays may be said to represent an actuator "beam." There is typically some overlap between adjacent actuators, meaning one actuator in an array often affects a sheet characteristic in its own associated zone and in adjacent zones associated with other actuators.

The paper-making process is a large-scale two-dimensional system with spatial and dynamic components. The control system 104 often continuously monitors and controls this process to ensure that the quality of the final product meets desired specifications. CD control can be used to minimize the variance in paper quality in the cross direction perpendicular to the sheet's travel. Model predictive control (MPC) or other advanced control techniques can be used by the control system 104 to perform CD control in the system 100. For example, at each of multiple sampling intervals, an MPC controller could compute a sequence of control actions by minimizing a performance index while incorporating input constraints (such as CD actuator limits) and output constraints (such as paper quality specifications). This type of CD control is often implemented using an online QP solver, which can be executed or otherwise implemented by the control system 104. As described below, an efficient QP solver having a dual-feasible active-set algorithm can be used to solve the control or optimization problem associated with CD control of paper-making processes.

The new QP solver disclosed here can be significantly faster than conventional solvers for complex problems (such as about five to about twenty times faster or more). This decreases the amount of time needed to generate a control solution, which could be particularly helpful when conventional solvers cannot compute control solutions within a control interval's length. The new QP solver can be implemented using any suitable device(s) in the system 100, such as within the control system 104 or as a stand-alone device. In particular embodiments, the QP solver is implemented using software, such as a real-time language like C or C++, executed by one or more processing systems.

Although FIG. 1 illustrates one example of a sheet manufacturing or processing system 100, various changes may be made to FIG. 1. For example, other systems could be used to produce paper products or other products. Also, while shown as including a single paper machine 102 with various components and a single control system 104, the production system 100 could include any number of paper machines or other production machinery having any suitable structure, and the system 100 could include any number of control systems. In addition, FIG. 1 illustrates one operational environment in which QP solving functionality can be used. This functionality could be used in any other suitable system.

Figure 4:
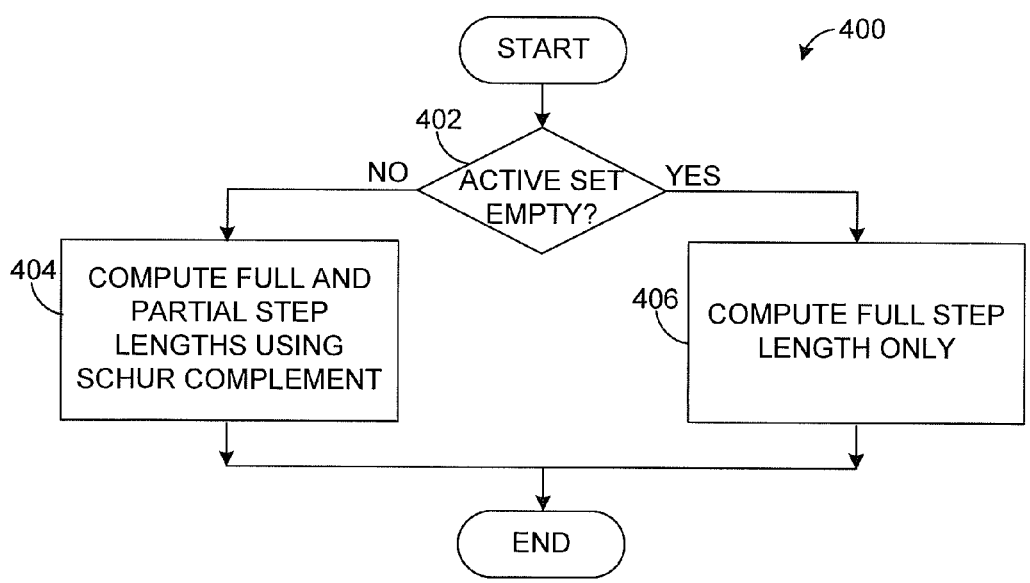
FIGS. 2 through 4 illustrate an example method for efficient quadratic programming (QP) solving for process control and optimization according to this disclosure.
Figure 2:
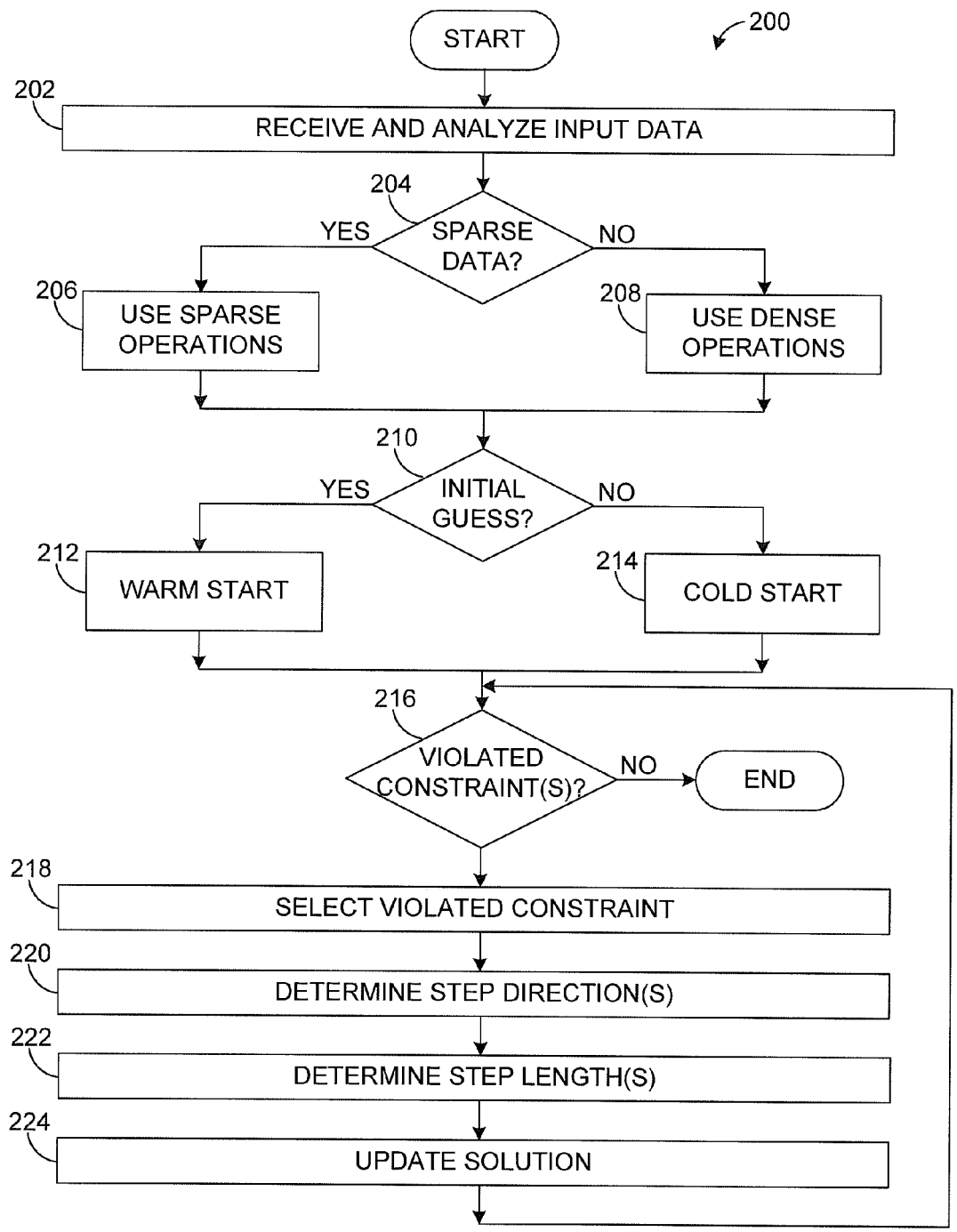
Figure 3:
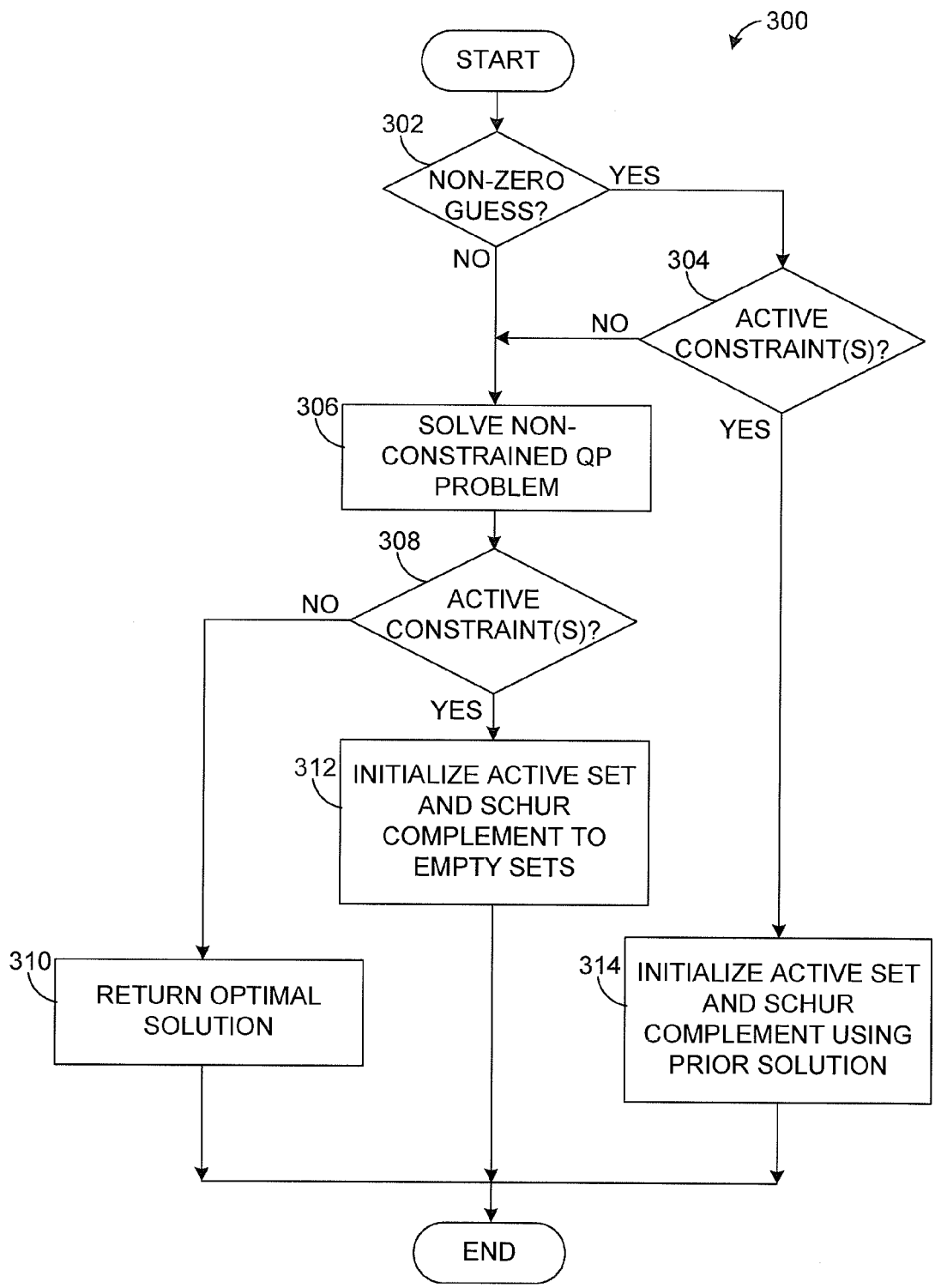

FIGS. 2 through 4 illustrate an example method for efficient QP solving for process control and optimization according to this disclosure. In particular, FIG. 2 illustrates an example method 200 for efficient QP solving, and FIGS. 3 and 4 illustrate example methods 300 and 400 that occur during the method 200 of FIG. 2. For ease of explanation, the methods 200-400 are described as being performed by the control system 104 in the system 100 of FIG. 1. However, the methods 200-400 could be performed by any other suitable device(s) and in any other suitable systems.

Prior to a discussion of the methods 200-400, consider the following system. A CD process can be modeled as a linear time-invariant system with multiple inputs and multiple outputs. An example process could be realized in the following state space form:

$$X_{k+1} = AX_k + B\Delta U_k \tag{1}$$

$$Y_k = CX_k \tag{2}$$

where $X_k \in R^{Nx}$, $\Delta U_k \in R^{Nu}$, and $Y_k \in R^{Ny}$ are respectively the state variables, the control moves, and the controlled variables at time k. Also, A, B, and C are respectively the state transition matrix, the input matrix, and the output matrix with compatible dimensions. $N_u$ is equal to $$\sum_{j=1}^{n_u} n_j,$$

where $n_u$ is the number of actuator beams and $n_j$ is the number of actuator arrays installed on the $j^{th}$ ($1 \leq j \leq n_u$) beam. With this, the following can be obtained:

$$\Delta U_k = \begin{bmatrix} \Delta u_k^1 \\ \Delta u_k^2 \\ \vdots \\ \Delta u_k^{n_u} \end{bmatrix}, \Delta u_k^j = \begin{bmatrix} \Delta u_k^{j,1} \\ \Delta u_k^{j,2} \\ \vdots \\ \Delta u_k^{j,n_j} \end{bmatrix} \tag{3}$$

It is noted that using $\Delta U_k$ instead of $U_k$ can simplify the predictions in each MPC iterations. The actual input at time k satisfies $U_k = U_{k-1} + \Delta U_k$, and $u_k^j = u_{k-1}^j + \Delta u_k^j$.

MPC for CD control (CD-MPC for short) uses a prediction model to obtain estimations of controlled variables in a specified time horizon. Here, $H_U$ denotes the control horizon, and $H_Y$ denotes the prediction horizon ($1 \leq H_U \leq H_Y$). Based on Equation (1), a prediction model can be derived as follows:

$$\hat{X}_{k+t} = A^t \hat{X}_k + \sum_{i=1}^{\min\{H_U, t\}} A^{t-i} B \Delta U_{k+i-1} \quad (4)$$

$$\hat{Y}_{k+t} = C\hat{X}_{k+1} \quad (5)$$

with $t=1, 2, \ldots, H_Y$. Here, it is assumed that (A, C) is observable, and $\hat{X}_k$ is an estimate of $X_k$.

In CD-MPC, the following cost function can be defined for obtaining a control move:

$$\min_{\Delta U \in R^{H_U \cdot N_U}} J = (\hat{Y} - Y^{sp})^T Q_1 (\hat{Y} - Y^{sp}) + \quad (6)$$

$$\Delta U^T Q_2 \Delta U + (U - U^{sp})^T Q_3 (U - U^{sp}) + U^T Q_4 U$$

where:

$$U = \begin{bmatrix} U_k \\ U_{k+1} \\ \vdots \\ U_{k+H_U-1} \end{bmatrix}, \Delta U = \begin{bmatrix} \Delta U_k \\ \Delta U_{k+1} \\ \vdots \\ \Delta U_{k+H_U-1} \end{bmatrix}, \hat{Y} = \begin{bmatrix} \hat{Y}_{k+1} \\ \hat{Y}_{k+2} \\ \vdots \\ \hat{Y}_{k+H_Y} \end{bmatrix} \quad (7)$$

$U_{sp}$ and $Y_{sp}$ are dimension-compatible vectors containing setpoints of the corresponding variables at different time instants. Also, $Q_1$, $Q_2$, $Q_3$, and $Q_4$ are weighting matrices, which can be generated by a CD-MPC tuning algorithm.

CD-MPC can also involve different physical constraints on actuators that make the problem in Equation (6) more difficult and time consuming to solve. For example, actuator setpoints often have upper and lower limits, such as:

$$u_{bound}^j \leq u_k^j \leq \bar{u}_{bound}^j, j = 1, 2, \ldots, n_u \quad (8)$$

Also, for each actuator beam, there can be a bend limit for two adjacent actuator zones, which can be expressed as:

$$|u_k^{j,2} - u_k^{j,1}| \leq \bar{u}_{bend1}^j \quad (9)$$

$$|u_k^{j,n_j} - u_k^{j,n_j-1}| \leq \bar{u}_{bend1}^j, j = 1, 2, \ldots, n_u \quad (10)$$

$$|u_k^{j,l} - 2u_k^{j,l-1} + u_k^{j,l-2}| \leq \bar{u}_{bend2}^j, l = 3, 4, \ldots, n_j \quad (11)$$

Further, in each actuator beam, the average of the actuator setpoints can be kept in a specified range, such as:

$$u_{avg}^j \leq \frac{1}{n_j} \sum_{l=1}^{n_j} u_k^{j,l} \leq \bar{u}_{avg}^j, j = 1, 2, \ldots, n_u \quad (12)$$

In addition, a large magnitude of $\Delta u_k^j$ may not be physically feasible, which can be expressed as:

$$|\Delta u_k^j| \leq \bar{u}_{delta}^j, j = 1, 2, \ldots, n_u \quad (13)$$

By including these constraints and replacing all variables by $\Delta U$, the CD-MPC problem can be formulated as a linear inequality-constrained QP problem, such as:

$$\min_{\Delta U \in R^{H_U \cdot N_U}} \mathcal{J} = \frac{1}{2} \Delta U^T G \Delta U + g^T \Delta U \quad (14)$$

subject to $A_c \Delta U \leq b_c$

Here, $G \in R^{(H_U \bullet N_U) \times (H_U \bullet N_U)}$ is a symmetric, strictly positive definite Hessian matrix. Also, $g \in R^{H_U \bullet N_U}$ is the gradient vector, $A_c \in R^{N_c \times (H_U \bullet N_U)}$ is the constraint matrix (where $N_C$ equals the number of different types of constraints), and $b_c \in R^{N_c}$ is the right-hand side constraint vector.

In this problem, G and $A_c$ can be sparse matrices with large dimensions. Moreover, the number of rows in $A_c$ can be much larger than the number of columns (meaning $N_C >> H_U \bullet N_U$), and some constraints are dependant on each other.

With this example problem formulation in mind, reference is now made to FIG. 2, which illustrates an example method 200 for efficient QP solving. The method 200 can be used, for example, to solve the QP problem in Equation (14) using a dual-feasible active-set algorithm. In this discussion of FIG. 2, the following notations and definitions are used:

Notations:
$\Delta U^{(k)}, \Lambda^{(k)}$: primal and dual variables at iteration k
$A_w, b_w$: active constraint set
$A_+, b_+$: violated constraint that should be added
$A_-, b_-$: active constraint that should be dropped
$(\bullet)_i$: $i^{th}$ row of a matrix or vector ($\bullet$)
$\Delta \vec{U}^{(k)}, \vec{\lambda}^{(k)}$: step directions of $\Delta U^{(k)}, \lambda^{(k)}$
$S_c$: Schur complement
$\Sigma^f, \tau^p$: full and partial step lengths
$\|\bullet\|$: Euclidean norm

DEFINITIONS

Active constraint: Any constraint subject to $A_i \Delta U^{(k)} - b_i = 0$
Inactive constraint: Any constraint subject to $A_i \Delta U^{(k)} - b_i < 0$
Violated constraint: Any constraint subject to $A_i \Delta U^{(k)} > b_i$ As shown in FIG. 2, input data is received and analyzed at step 202. This could include, for example, the control system 104 receiving measurement data from one or more of the sensor arrays 126-128. This could also include the control system 104 receiving or generating a Hessian matrix and actuator constraint matrices associated with the process being controlled. The input data could involve any suitable process being controlled, such as a paper-making process for forming a paper sheet 108.

A determination is made whether certain data associated with the process is sparse data at step 204. This could include, for example, the control system 104 determining whether the Hessian and actuator constraint matrices are sparse matrices. Sparse matrices can use less storage and can be manipulated more efficiently, so this determination can be used to determine which types of matrix functions are invoked during the method 200. The Hessian matrix often has a band diagonal structure (a sparse structure), but sometimes it may have a dense structure. The sparsity of a matrix can be determined in any suitable manner. Once a determination is made, a sparse QP solver can be invoked at step 206, or a dense QP solver can be invoked at step 208. In particular embodiments, the sparse version does not factorize the Hessian matrix, while the dense version can use a Cholesky factorization of the Hessian matrix when computing step directions using a Schur complement as described below. The dense version can still exploit the sparsity of the constraint matrix even when the Hessian is not sparse.

A determination is made whether an initial guess of the problem solution is available at step 210. In MPC and other advanced control applications, the solution points for two consecutive QP problems are often relatively close to each other. Therefore, it can be useful to use the optimal solution to a previous QP problem as the initial guess for a solution to a current QP problem. This can significantly reduce the number of iterations needed to identify the optimal solution to the current QP problem. If an initial guess for the solution to a current QP problem is available, a "warm" start occurs at step 212. Otherwise, a "cold" start occurs at step 214.

FIG. 3 illustrates an example method 300 for startup using a warm or cold start. A determination is made whether an initial guess is non-zero at step 302. An initial guess of zero indicates that a prior solution is not available, and a cold start occurs. In a cold start, an initial solution is set by solving a non-constrained QP problem (a QP problem without any active constraints) at step 306. This can be expressed as:

$$(\Delta U^{(0)}, \lambda^{(0)}) := (-G^{-1}g, 0) \quad (15)$$

$$A_w^{(0)} = 0 \quad (16)$$

A determination is made whether there are any active constraints in the initial solution at step 308. If there are not any active constraints, an optimal solution to the QP problem is returned at step 310. If there are any active constraints, the active set $A_w$ and the Schur complement are set to empty sets at step 312.

A non-zero initial guess at step 302 indicates that a prior solution is available, and a warm start may occur. A determination is made whether the prior solution has any active constraints at step 304. If there are not any active constraints, the process moves to step 306 and proceeds as described above. If there are any active constraints, a warm start occurs, and the optimal solution to a previous QP problem can be used in various ways. In some embodiments, for instance, the optimal solution to the previous QP problem is used to identify active constraints and initialize an active set and other related variables at step 314.

Returning to FIG. 2, an iterative process using a dual-feasible active-set algorithm then occurs, where any violated constraints are brought into the active constraint set of the solution. A determination is made whether there are any violated constraints at step 216. If not, the method 200 ends as there are no additional constraints to be brought into the active constraint set of the solution. At this point, the optimal solution denoted as $\Delta U^*$ has been found, which can be expressed as:

$$\Delta U^* \rightarrow \Delta U^k \quad (17)$$

Otherwise, one of the violated constraints is selected at step 218, one or more step directions are determined at step 220, the step length is determined at step 222, and the solution is updated at step 224. Here, the violated constraint that is selected can be denoted A, and In an active set method, at a current point $\Delta U^{(k)}$, a step direction $\Delta \vec{U}^{(k)}$ and a step length $\tau$ are computed to define the next iteration $\Delta U^{(k)} + \tau \Delta \vec{U}^{(k)}$. Similarly, at a current point $\lambda^{(k)}$, a step direction $\vec{\lambda}^{(k)}$ and a step length $\tau$ are computed to define the next iteration $\lambda^{(k)} + \tau \vec{\lambda}^{(k)}$.

In some embodiments, the step lengths can be calculated as shown in FIG. 4. A determination can be made whether the active set is empty at step 402. If the active set is not empty, full and partial step lengths can be determined at step 404. If the active set is empty, only the full step length is determined at step 406. In particular embodiments, step directions and full step lengths are computed by solving an augmented Karush-Kuhn-Tucker (KKT) system. An example KKT system can be expressed as:

$$\begin{bmatrix} G & A_w^T & A_+^T \\ A_w & 0 & 0 \\ A_+ & 0 & 0 \end{bmatrix} \begin{bmatrix} \Delta U^{(k)} + \tau^f \Delta \vec{U}^{(k)} \\ \lambda^{(k)} + \tau^f \vec{\lambda}^{(k)} \\ \tau^f \end{bmatrix} = \begin{bmatrix} -g \\ b_w \\ b_+ \end{bmatrix} \quad (18)$$

After some manipulation of Equation (18), the solution of $\tau^f$ can be obtained, and the equations to calculate $\Delta \vec{U}^{(k)}$ and $\vec{\lambda}^{(k)}$ can be expressed as:

$$\begin{bmatrix} G & A_w^T \\ A_w & 0 \end{bmatrix} \begin{bmatrix} \Delta \vec{U}^{(k)} \\ \vec{\lambda}^{(k)} \end{bmatrix} = \begin{bmatrix} -A_+^T \\ 0 \end{bmatrix} \quad (19)$$

$$\tau^f = \frac{b_+ - A_+ \Delta U^{(k)}}{A_+ \Delta \vec{U}^{(k)}} \quad (20)$$

Notice that a full step length need not be taken since some dual variables are possibly negative if the full step length is taken. In such a situation, dual feasibility is not guaranteed. For this reason, a maximum step length that maintains all dual variables non-negative can be determined, and this is referred to as a partial step length. This can be expressed as:

$$\lambda_i^{(k)} + \tau^p \vec{\lambda}_i^{(k)} \geq 0 \quad (21)$$

Therefore, the partial step length could be calculated as:

$$\tau^p := \min_i \left\{ -\frac{\lambda_i^{(k)}}{\vec{\lambda}_i^{(k)}} \middle| \vec{\lambda}_i^{(k)} < 0 \right\} \quad (22)$$

Once the full and partial step lengths are calculated, the values of $\tau^f$ and $\tau^p$ can be used to determine how to update the problem solution. If both $\tau^f$ and $\tau^p$ equal infinity ($\infty$), it can imply that the current solution in infeasible. If only $\tau^f$ equals infinity, the selected violated constraint can be linearly dependent on at least one of the constraints in $A_w$. In that case, a partial solution update can occur as follows:

(a) drop the constraint $A_-$ and $b_-$ from $A_w$ and $b_w$, where the row index of the dropped constraint is equal to:

$$\operatorname*{argmin}_{i}\left\{-\frac{\lambda_i^{(k)}}{\vec{\lambda}_i^{(k)}}\middle|\vec{\lambda}_i^{(k)}<0\right\} \quad (23)$$

(b) set $\lambda^{(k+1)}=\lambda^{(k)}+\tau^p\lambda'^{(k)}$ and delete the dual variable associated with the dropped constraint; and (c) set k=k+1 and repeat steps (a)-(b) without searching for a new violated constraint.

If $\tau^p \leq \tau^f < \infty$, the following can be set:

$$\Delta U^{(k+1)} = \Delta U^{(k)} + \tau^p \Delta \vec{U}^{(k)} \quad (24)$$

in addition to steps (a)-(c) above. If $\tau^f \leq \tau^p$, a full solution update can occur as follows:

(a') add the violated constraint to $A_w$ and $b_w$;
(b') set:

$$\begin{cases} \Delta U^{(k+1)} = \Delta U^{(k)} + \tau^f \Delta \vec{U}^{(k)} \\ \lambda^{(k+1)} = \begin{bmatrix} \lambda^{(k)} + \tau^f \vec{\lambda}^{(k)} \\ \tau^f \end{bmatrix} \end{cases} \quad (25)$$

(c') set k=k+1 and repeat starting with a new violated constraint search.

In the algorithm described above, one of the more time-consuming portions of the algorithm is the computation of $\Delta \vec{U}^{(k)}$ and $\vec{\lambda}^{(k)}$ in Equations (19)-(20). Since this is an equilibrium system, it can be solved in various ways, such as by triangular factorization or Gaussian elimination. Example solutions can thus be explicitly given by:

$$\Delta \vec{U}^{(k)} = -G^{-1}[A_+^T + A_w^T \vec{\lambda}^{(k)}] \quad (26)$$

$$\vec{\lambda}^{(k)} = S_c^{-1} A_w G^{-1} A_+^T \quad (27)$$

where $S_c = -A_w G^{-1} A_w^T$ is called the Schur complement. Comparing Equations (26)-(27) with Equations (19)-(20), $S_c^{-1}$ can be determined, which has a much smaller dimension than the matrix:

$$\begin{bmatrix} G & A_w^T \\ A_w & 0 \end{bmatrix}^{-1} \quad (28)$$

Furthermore, $G^{-1}$ can be calculated in the initial step and stored for reuse, which can help speed up the computations.

The Schur complement can also be augmented when a constraint is added/dropped. In a full update, a new constraint is added to $A_w$, and one more step can be added to augment the Schur complement as follows:

$$S_c = \begin{bmatrix} S_c & -A_w G^{-1} A_+^T \\ -A_+ G^{-1} A_w^T & -A_+ G^{-1} A_+^T \end{bmatrix} \quad (29)$$

In a partial update, a constraint is dropped from $A_w$. Accordingly, the Schur complement can be changed by deleting the corresponding row and column of $S_c$.

Regarding the Schur complement used here, it is nonsingular throughout the iteration steps, which can help to improve the reliability of the QP solver. At iteration k of the process, if $A_w$ has a full row rank and $A_+$ is linearly dependent on the rows of $A_w$, $A_+$ may not be added to the active constraint set. From Equation (19), it can be established that:

$$\begin{cases} G\Delta \vec{U}^{(k)} + A_w^T \vec{\lambda}^{(k)} = -A_+^T \\ A_w \Delta \vec{U}^{(k)} = 0 \end{cases} \quad (30)$$

which implies:

$$A_w G^{-1} A_w^T \vec{\lambda}^{(k)} = -A_w G^{-1} A_+^T \quad (31)$$

Since $A_w$ has full row rank, $\vec{\lambda}^{(k)}$ has a unique solution. On the other hand, if $A_+$ is linearly dependent on the rows of $A_w$, there exists a vector $z_0$ satisfying:

$$A_w^T z_0 = -A_+^T \quad (32)$$

It turns out that $z_0$ is a solution to Equation (31). Thus:

$$\begin{cases} \Delta \vec{U}^{(k)} = 0 \quad (0 \text{ is zero vector}) \\ \vec{\lambda}^{(k)} = z_0 \end{cases} \quad (33)$$

is the solution of Equation (19). Since $\Delta U^{(k)}=0$ implies $\tau^f=\infty$, $A_+$ is not added to $A_w$.

Moreover, if the Hessian matrix G in Equation (14) is strictly positive definite, the Schur complement $S_c$ can always be nonsingular during the iteration steps. To establish that $S_c$ is nonsingular, it suffices to show that $A_w$ always has full row rank because G is strictly positive definite. In the initial step (cold start), $A_w=0$ means no constraint is included in the active set. When the first constraint is added, $A_w$ becomes full row rank. Once $A_w$ has full row rank, newly added constraints are independent with the existing constraints in $A_w$. Thus, $A_w$ always has full row rank except during the initial step, so $S_c$ is nonsingular throughout its iterations.

Another time-consuming portion of this active set algorithm is solving the underlying KKT system at optimization iterations. In some embodiments, the Schur complement is always invertible, which can be computationally cheaper and reliable than conventional systems.

To summarize, some embodiments of the proposed QP solver disclosed here contain (among others) the following features:

The QP solver exploits the sparsity of the problem data (such as the Hessian and constraints matrices) to speed up computations and reduce memory requirements of the solver.

The Schur complement used by the QP solver is guaranteed to be nonsingular.

The QP solver employs a warm startup to take advantage of the initial guess for the optimal solution to reduce the number of optimization iterations.

All constraints can be uniformly treated as inequalities, which helps to simplify calculations.

Although FIGS. 2 through 4 illustrate examples of methods for efficient QP solving for process control and optimization, various changes may be made to FIGS. 2 through 4. For example, while shown as a series of steps, various steps in each figure could overlap, occur in parallel, occur in a different order, or occur any number of times.

Note that in the description above, it has been assumed that the QP problem being solved relates to the control of cross-direction actuators in a paper-making process. However, the QP solver described above could be used to solve a QP problem associated with any other suitable device or system.

Figure 5:
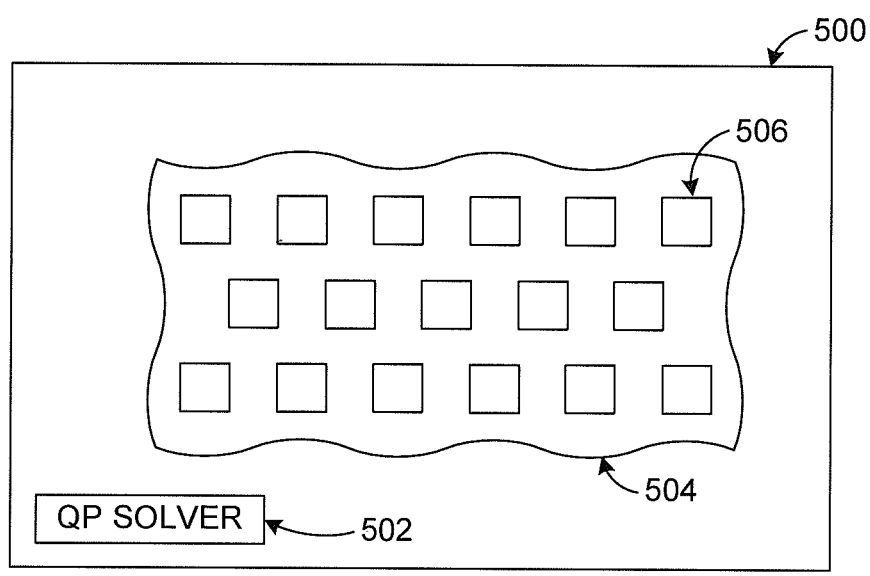
FIG. 5 illustrates an example system using an efficient QP solver for process control and optimization according to this disclosure.

FIG. 5 illustrates an example system 500 using an efficient QP solver for process control and optimization according to this disclosure. The system 500 here generically represents any suitable system that uses QP problem solving for control.

In the system 500, a QP solver 502 is used to solve QP problems associated with control of a spatially distributed actuating array 504, whose individual actuators 506 are distributed in space. The QP solver 502 could represent a stand-alone device or be integrated into another device or system, such as a control system. The QP solver 502 could be implemented in any suitable manner, such as using at least one processing device, at least one memory, and at least one network interface.

The array 504 represents any suitable collection of actuators 506 in any suitable configuration. The array 504 could represent a one-dimensional array of actuators or a multi-dimensional array of actuators. The actuators 506 represent any suitable actuators for performing one or more functions within a larger system.

In some embodiments, the QP solver 502 can be used with any large-scale system where one actuator 506 interacts with or affects adjacent actuators. In these types of systems, controlling or optimizing the actuators 506 can involve the generation and solution of a QP problem. The QP solver 502 can perform the same types of operations described above to solve the QP problem. Note that the specific equations used to solve the QP problem can vary depending, for example, on the type of actuators 506 being controlled. Moreover, certain operations described above could be omitted, such as the determination whether input data is sparse. Depending on the type of actuators 506 being controlled, there may be only sparse data matrices or only dense data matrices involved in the calculations.

Note that the system 500 could represent any suitable device or system that uses multiple actuators with overlapping effects. Example systems include the paper-making system described above or similar sheet-making systems. Other example systems could include large telescopes where the actuators 506 control mirrors in the telescopes or any other large-scale spatially-distributed systems.

Although FIG. 5 illustrates one example of a system 500 using an efficient QP solver 502 for process control and optimization, various changes may be made to FIG. 5. For example, the system 500 could include any number of actuator arrays, each containing any number of actuators.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying an initial solution to a quadratic programming (QP) problem associated with a process; and
using at least one processing device to perform an iterative procedure comprising one or more iterations, wherein each iteration comprises:
determining whether any constraint associated with the process is violated in the solution; and
if so, selecting a violated constraint, determining a step direction and a step length associated with the selected violated constraint, and updating the solution based on the step direction and the step length;
wherein determining the step direction and the step length comprises using a Schur complement based on an active set of constraints associated with the solution; and
wherein the Schur complement is nonsingular during all iterations of the iterative procedure except when the active set is empty.

2. The method of claim 1, wherein:
determining the step direction and the step length comprises identifying full and partial step lengths; and
updating the solution comprises updating the solution using the full and partial step lengths.

3. The method of claim 2, wherein updating the solution comprises:
adding the selected violated constraint to the active set and initiating another iteration of the iterative procedure.

4. The method of claim 2, wherein updating the solution comprises:
dropping at least one constraint from the active set, the selected violated constraint linearly dependent on the at least one dropped constraint.

5. The method of claim 1, further comprising:
determining if at least one matrix associated with the process is sparse; and
processing the at least one matrix based on the determination.

6. The method of claim 5, wherein:
determining if the at least one matrix is sparse comprises determining whether a Hessian matrix associated with the process is sparse; and
processing the at least one matrix based on the determination comprises:
applying a Cholesky factorization to the Hessian matrix when the Hessian matrix is not sparse; and applying no factorization to the Hessian matrix when the Hessian matrix is sparse.

7. The method of claim 1, wherein all constraints associated with the process are expressed as inequalities.

8. The method of claim 1, wherein identifying the initial solution comprises using a solution to a prior QP problem as the initial solution.

9. The method of claim 1, further comprising:
controlling or optimizing the process using the solution to the QP problem.

10. The method of claim 1, further comprising:
ending the iterative procedure upon a determination that no constraints associated with the process are violated in the solution.

11. The method of claim 1, wherein:
the process is associated with a sheet manufacturing or processing system; and
the method further comprises controlling or optimizing the sheet manufacturing or processing system using the solution to the QP problem.

12. An apparatus comprising:
at least one memory configured to store an initial solution to a quadratic programming (QP) problem associated with a process; and
at least one processing device configured to perform an iterative procedure comprising one or more iterations, wherein during each iteration the at least one processing device is configured to:
determine whether any constraint associated with the process is violated in the solution; and
if so, select a violated constraint, determine a step direction and a step length associated with the selected violated constraint, and update the solution based on the step direction and the step length;
wherein the at least one processing device is configured to determine the step direction and the step length using a Schur complement based on an active set of constraints associated with the solution; and
wherein the Schur complement is nonsingular during all iterations of the iterative procedure except when the active set is empty.

13. The apparatus of claim 12, wherein:
the at least one processing device is configured to determine the step direction and the step length by identifying full and partial step lengths; and
the at least one processing device is configured to update the solution using the full and partial step lengths.

14. The apparatus of claim 12, wherein the at least one processing device is further configured to:
determine if at least one matrix associated with the process is sparse; and
process the at least one matrix based on the determination.

15. The apparatus of claim 14, wherein:
the at least one processing device is configured to determine if the at least one matrix is sparse by determining whether a Hessian matrix associated with the process is sparse; and
the at least one processing device is configured to process the at least one matrix based on the determination by:
applying a Cholesky factorization to the Hessian matrix when the Hessian matrix is not sparse; and
applying no factorization to the Hessian matrix when the Hessian matrix is sparse.

16. The apparatus of claim 12, wherein the at least one processing device is configured to identify the initial solution by using a solution to a prior QP problem as the initial solution.

17. The apparatus of claim 12, wherein:
the process is associated with a sheet manufacturing or processing system; and
the at least one processing device is further configured to control or optimize the sheet manufacturing or processing system using the solution to the QP problem.

18. A non-transitory computer readable storage medium embodying a computer program, the computer program comprising computer readable program code for:
identifying an initial solution to a quadratic programming (QP) problem associated with a process; and
performing an iterative procedure comprising one or more iterations, wherein each iteration comprises:
determining whether any constraint associated with the process is violated in the solution; and
if so, selecting a violated constraint, determining a step direction and a step length associated with the selected violated constraint, and updating the solution based on the step direction and the step length;
wherein the computer readable program code for determining the step direction and the step length comprises computer readable program code for using a Schur complement based on an active set of constraints associated with the solution; and
wherein the Schur complement is nonsingular during all iterations of the iterative procedure except when the active set is empty.

19. The computer readable storage medium of claim 18, wherein:
the computer readable program code for determining the step direction and the step length comprises computer readable program code for identifying full and partial step lengths; and
the computer readable program code for updating the solution comprises computer readable program code for updating the solution using the full and partial step lengths.

20. The computer readable storage medium of claim 18, wherein the computer program further comprises:
computer readable program code for determining if at least one matrix associated with the process is sparse; and
computer readable program code for processing the at least one matrix based on the determination.

21. The computer readable storage medium of claim 18, wherein all constraints associated with the process are expressed as inequalities.

22. The computer readable storage medium of claim 18, wherein the computer readable program code for identifying the initial solution comprises computer readable program code for using a solution to a prior QP problem as the initial solution.

23. The computer readable storage medium of claim 18, wherein:
the process is associated with a sheet manufacturing or processing system; and
the computer program further comprises computer readable program code for controlling or optimizing the sheet manufacturing or processing system using the solution to the QP problem.

* * * * *